United States Patent
Kang et al.

(10) Patent No.: US 8,744,167 B2
(45) Date of Patent: Jun. 3, 2014

(54) METHOD, MEDIUM, AND APPARATUS OF FILTERING DEPTH NOISE USING DEPTH INFORMATION

(75) Inventors: Byong Min Kang, Yongin-si (KR); Hwa Sup Lim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 709 days.

(21) Appl. No.: 12/654,208

(22) Filed: Dec. 14, 2009

(65) Prior Publication Data

US 2010/0183236 A1   Jul. 22, 2010

(30) Foreign Application Priority Data

Jan. 21, 2009   (KR) .................. 10-2009-0005090

(51) Int. Cl.
*G06K 9/00* (2006.01)
*G06K 9/40* (2006.01)
*H04N 13/00* (2006.01)

(52) U.S. Cl.
USPC .............................. 382/154; 382/260; 348/42

(58) Field of Classification Search
USPC ......... 382/106, 154, 199, 103, 107, 285, 286, 382/254–268; 345/419–420, 426
See application file for complete search history.

(56) References Cited

U.S. PATENT DOCUMENTS

| | | | |
|---|---|---|---|
| 7,889,949 B2 * | 2/2011 | Cohen et al. .................. | 382/299 |
| 7,957,470 B2 * | 6/2011 | Rodriguez et al. ........ | 375/240.25 |
| 8,248,410 B2 * | 8/2012 | Tan ............................... | 345/420 |
| 2004/0109004 A1 * | 6/2004 | Bastos et al. .................. | 345/587 |
| 2007/0024614 A1 * | 2/2007 | Tam et al. ..................... | 345/419 |
| 2008/0247670 A1 * | 10/2008 | Tam et al. ..................... | 382/298 |
| 2011/0274366 A1 * | 11/2011 | Tardif ........................... | 382/260 |

FOREIGN PATENT DOCUMENTS

| | | |
|---|---|---|
| JP | 08-018852 | 1/1996 |
| JP | 2001-189878 | 7/2001 |
| JP | 2001-189944 | 7/2001 |
| KR | 10-0806201 | 2/2008 |
| KR | 10-2008-0059462 | 6/2008 |

OTHER PUBLICATIONS

Liang Zhang; Tam, W.J.; , "Stereoscopic image generation based on depth images for 3D TV," Broadcasting, IEEE Transactions on , vol. 51, No. 2, pp. 191-199, Jun. 2005.*

Tam et al, Smoothing depth maps for improved stereoscopic image quality, Three-Dimensional TV, Video, and Display III, edited by Bahram Javidi, Fumio Okano, Proceedings of SPIE vol. 5599, (SPIE, Bellingham, WA, 2004).*

Gangwal, O.P.; Berretty, R.-P.; , "Depth map post-processing for 3D-TV," Consumer Electronics, 2009. ICCE '09. Digest of Technical Papers International Conference on , vol., No., pp. 1-2, Jan. 10-14, 2009.*

(Continued)

*Primary Examiner* — Andrae S Allison
(74) *Attorney, Agent, or Firm* — Staas & Halsey LLP

(57) ABSTRACT

A depth noise filtering method and apparatus is provided. The depth noise filtering method may perform spatial filtering or temporal filtering according to depth information. In order to perform spatial filtering, the depth noise filtering method may determine a characteristic of a spatial filter based on depth information. Also, in order to perform temporal filtering, the depth noise filtering method may determine a number of reference frames based on depth information. The depth noise filtering method may adaptively remove depth noise according to depth information and thereby enhance a noise filtering performance.

11 Claims, 12 Drawing Sheets

(56) References Cited

OTHER PUBLICATIONS

Daribo, I.; Tillier, C.; Pesquet-Popescu, B., "Distance Dependent Depth Filtering in 3D Warping for 3DTV," Multimedia Signal Processing, 2007. MMSP 2007. IEEE 9th Workshop on , vol., No., pp. 312,315, Oct. 1-3, 2007.*

Extended European Search Report issued Jan. 30, 2013, in corresponding European Patent Application No. 12178575.2.

Mehmet K Özkan et al., "Motion-Adaptive Weighted Averaging for Temporal Filtering of Noisy Image Sequences", Electrical Engineering Department , University of Rochester, NY, 1992, pp. 201-212.

Ljubomir Jovanov et al., "Content Adaptive Wavelet Based Method for Joint Denoising of Depth and Luminance Images", Telecommunication and Information Processing Department, Ghent University, 2007, pp. 1-8.

W.J. Tam et al., "Non-Uniform Smoothing of Depth Maps before Image-Based Rendering", Communications Research Centre Canada, 2004, pp. 173-183.

\* cited by examiner

METHOD, MEDIUM, AND APPARATUS OF FILTERING DEPTH NOISE USING DEPTH INFORMATION

CROSS-REFERENCE TO RELATED APPLICATIONS

This application claims the benefit of Korean Patent Application No. 10-2009-0005090, filed on Jan. 21, 2009, in the Korean Intellectual Property Office, the disclosure of which is incorporated herein by reference.

BACKGROUND

1. Field

One or more embodiments relate to an image process to process a three-dimensional (3D) image, and more particularly, to a depth noise filtering method and apparatus that may filter depth noise occurring according to a depth.

2. Description of the Related Art

As the demand for three-dimensional (3D) images increases, 3D cameras capable of collecting the 3D images have been appearing in the market. The 3D camera may obtain color information and depth information associated with an object to provide a 3D effect for a two-dimensional (2D) image. The depth information may be determined based on a distance between the object and the 3D camera.

Due to an image collection characteristic of the 3D camera, a characteristic of depth noise included in the depth information may be different depending on a distance from the object. When constructing a 3D image based on depth information containing large depth noise, a quality of the 3D image may be deteriorated.

Accordingly, there is a need for a method that may remove depth noise according to a distance between an object and a camera.

SUMMARY

According to an aspect of one or more embodiments, there may be provided a method of filtering depth noise, the method including obtaining depth information of a region that constitutes a filtering target frame of a three-dimensional (3D) image, generating a spatial filter for the region using the depth information, and performing depth noise filtering for the 3D image by applying the spatial filter to the depth information of the region.

The depth information may correspond to a distance between an object and an image collection apparatus with respect to the region, and the generating may comprise determining at least one of a size of the spatial filter and a coefficient of the spatial filter to be applied to the region, based on the depth information.

The generating may comprise determining the size of the spatial filter based on the depth information, using at least one of the depth information, a measured maximum distance of the image collection apparatus, a measured minimum distance of the image collection apparatus, and a maximum size of the spatial filter in the measured maximum distance.

The generating may comprise generating the spatial filter corresponding to the depth information by referring to a table that stores spatial filter information associated with at least one of the size of the spatial filter and the coefficient of the spatial filter that are predetermined based on the depth information.

The generating may further comprise decreasing the size of the spatial filter as the depth information corresponds to shorter distances.

The generating may further comprise increasing a decrease rate for the coefficient of the spatial filter as the depth information corresponds to shorter distances, and the coefficient of the spatial filter decreases while approaching a circumference of the spatial filter from a center of the spatial filter.

The region may be any one of pixels or blocks that constitutes the filtering target frame.

According to another aspect of one or more embodiments, there may be provided a method of filtering depth noise, the method including obtaining depth information of a region that constitutes a filtering target frame of a 3D image, calculating a number of reference frames associated with the region using the depth information, and updating the depth information of the region in the filtering target frame based on the calculated number of reference frames.

A spatial filter may be applied to the depth information before the calculating of a number of reference frames.

The updating may perform temporal filtering of the depth information.

The updating may further perform spatial filtering of the updated depth information.

The updating may further generate a spatial filter using the updated depth information, and applies the spatial filter to the updated depth information.

The method may perform spatial filtering and then perform temporal filtering on the depth information.

The method may perform temporal filtering and then perform spatial filtering on the depth information.

The updating may further apply a weight to the depth information of the region of each of the reference frames, the weight being based on the calculated number of reference frames.

The depth information may correspond to a distance between an object and an image collection apparatus with respect to the region, and the calculating may comprise calculating the number of reference frames based on the depth information, using at least one of the depth information, a measured maximum distance of the image collection apparatus, a measured minimum distance of the image collection apparatus, and a number of reference frames in the measured maximum distance.

The calculating may further comprise decreasing the number of reference frames as the depth information of the region corresponds to shorter distances.

The updating may further comprise averaging depth information of a region of each of the reference frames to update the depth information of the region in the filtering target frame.

According to still another aspect of one or more embodiments, there may be provided a method of filtering depth noise, the method including obtaining depth information of a region that constitutes a filtering target frame of a 3D image, generating a spatial filter for the region using the depth information to apply the spatial filter to the depth information of the region, calculating a number of reference frames associated with the region using the depth information of the region that constitutes the filtering target frame, wherein the spatial filter is applied to the depth information, and updating the depth information of the region in the filtering target frame based on the calculated number of reference frames.

The depth information may correspond to a distance between an object and an image collection apparatus with respect to the region, and the generating may comprise determining at least one of a size of the spatial filter and a coefficient of the spatial filter to be applied to the region, based on the depth information.

The generating may further comprise generating the spatial filter corresponding to the depth information by referring to a table that stores spatial filter information associated with at least one of the size of the spatial filter and the coefficient of the spatial filter that are predetermined based on the depth information.

The generating may further comprise determining the size of the spatial filter based on the depth information, using at least one of the depth information, a measured maximum distance of the image collection apparatus, a measured minimum distance of the image collection apparatus, and a maximum size of the spatial filter in the measured maximum distance.

The depth information may correspond to a distance between an object and an image collection apparatus with respect to the region, and the calculating may comprise calculating the number of reference frames based on the depth information, using at least one of the depth information, a measured maximum distance of the image collection apparatus, a measured minimum distance of the image collection apparatus, and a number of reference frames in the measured maximum distance.

The updating may comprise averaging depth information of a region of each of the reference frames to update the depth information of the region in the filtering target frame.

According to yet another aspect of one or more embodiments, there may be provided a method of filtering depth noise, the method including calculating a number of reference frames with respect to a region that constitutes a filtering target frame of a 3D image, using depth information of the region, updating depth information of the region in the filtering target frame based on the calculated number of reference frames, and generating a spatial filter for the region using the updated depth information to apply the spatial filter to the depth information of the region.

The depth information may correspond to a distance between an object and an image collection apparatus with respect to the region, and the calculating of the number of reference frames may comprise calculating the number of reference frames based on the depth information, using at least one of the depth information, a measured maximum distance of the image collection apparatus, a measured minimum distance of the image collection apparatus, and a number of reference frames in the measured maximum distance.

The updating may comprise averaging depth information of a region of each of the reference frames to update the depth information of the region in the filtering target frame.

The depth information may correspond to a distance between an object and an image collection apparatus with respect to the region, and the generating may comprise determining at least one of a size of the spatial filter and a coefficient of the spatial filter to be applied to the region, based on the updated depth information.

The generating may comprise generating the spatial filter corresponding to the updated depth information by referring to a table that stores spatial filter information associated with at least one of the size of the spatial filter and the coefficient of the spatial filter that are predetermined based on the updated depth information.

The generating may comprise determining the size of the spatial filter based on the updated depth information, using at least one of the depth information, a measured maximum distance of the image collection apparatus, a measured minimum distance of the image collection apparatus, and a maximum size of the spatial filter in the measured maximum distance.

According to a further another aspect of one or more embodiments, there may be provided a method of generating a spatial filter, the method including obtaining depth information of a region that constitutes a filtering target frame of a 3D image, determining a characteristic of a spatial filter for the region based on the depth information, and generating the spatial filter to be applied to the region based on the characteristic of the spatial filter.

The depth information may correspond to a distance between an object and an image collection apparatus with respect to the region, and the determining comprises determining at least one of a size of the spatial filter and a coefficient of the spatial filter to be applied to the region, based on the depth information.

The generating may comprise generating the spatial filter corresponding to the depth information by referring to a table that stores spatial filter information associated with at least one of the size of the spatial filter and the coefficient of the spatial filter that are predetermined based on the depth information.

The determining may comprise determining the size of the spatial filter based on the depth information, using at least one of the depth information, a measured maximum distance of the image collection apparatus, a measured minimum distance of the image collection apparatus, and a maximum size of the spatial filter in the measured maximum distance.

The determining may comprise decreasing the size of the spatial filter as the depth information is updated to correspond to a shorter distance.

The determining may comprise increasing a decrease rate for the coefficient of spatial filter as the depth information is updated to correspond to a shorter distance, and the coefficient of the spatial filter decreases while approaching a circumference of the spatial filter from a center of the spatial filter.

According to still another aspect of one or more embodiments, there may be provided an apparatus for filtering depth noise, the apparatus including a spatial filter generation unit to generate a spatial filter for a region that constitutes a filtering target frame of a 3D image, using depth information of the region, and a filtering unit to perform depth noise filtering for the 3D image by applying the spatial filter to the depth information of the region.

The depth information may correspond to a distance between an object and an image collection apparatus with respect to the region, and the spatial filter generation unit determines at least one of a size of the spatial filter and a coefficient of the spatial filter to be applied to the region, based on the depth information.

The spatial filter generation unit may generate the spatial filter corresponding to the depth information by referring to a table that stores spatial filter information associated with at least one of the size of the spatial filter and the coefficient of the spatial filter that are predetermined based on the depth information.

According to still another aspect of one or more embodiments, there may be provided an apparatus for filtering depth noise, the apparatus including a frame calculation unit to calculate a number of reference frames associated with a region that constitutes a filtering target frame of a 3D image, using first depth information of the region, and a depth information decision unit to determine second depth information of the region in the filtering target frame based on the calculated number of reference frames.

The depth information decision unit may average depth information of a region of each of the reference frames to determine the second depth information of the region in the filtering target frame.

The apparatus may perform temporal filtering using the second depth information.

The apparatus may perform spatial filtering using the second depth information.

The depth information decision unit may further determine third depth information by generating a spatial filter using the second depth information, and applying the spatial filter to the second depth information.

The apparatus may perform spatial filtering and then perform temporal filtering.

The apparatus may perform temporal filtering and then perform spatial filtering.

The depth information decision unit may apply a weight to the depth information of the region of each of the reference frames, and the weight may be based on the calculated number of reference frames.

The apparatus may apply a spatial filter to depth information to generate the first depth information.

The apparatus may generate the spatial filter using depth information other than the first and second depth information.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
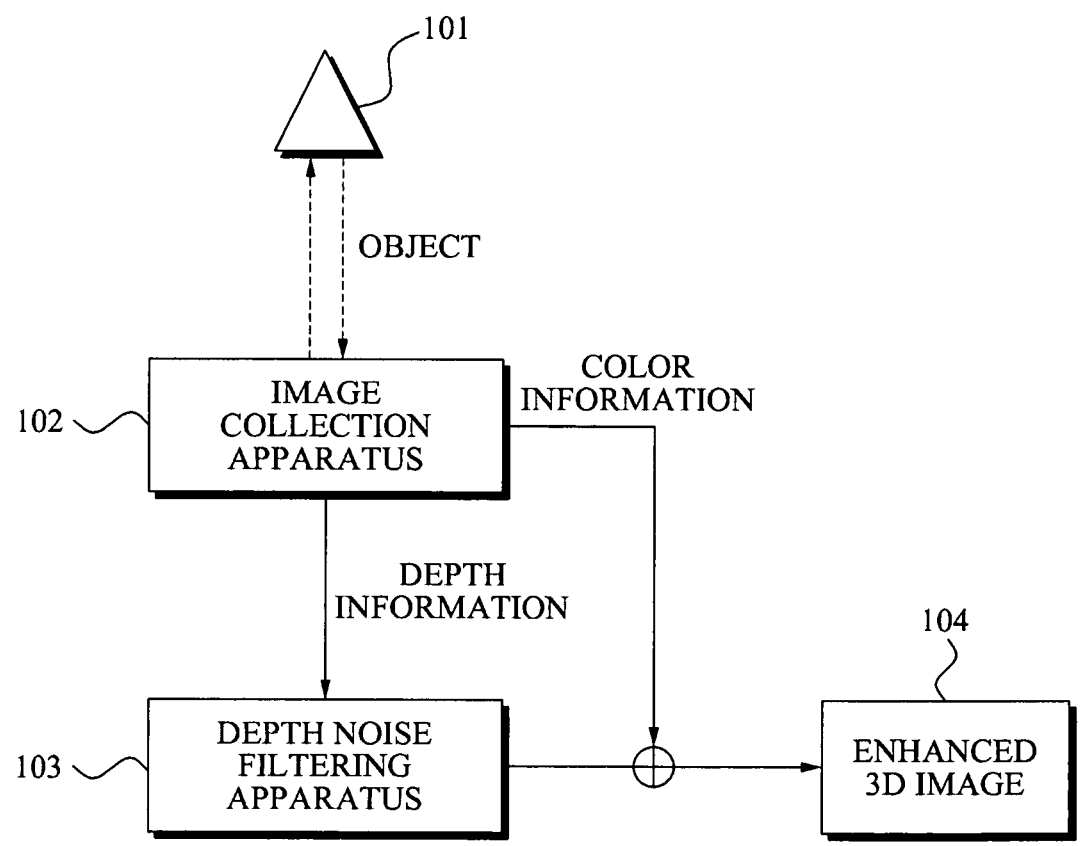
FIG. 1 illustrates a process of reconstructing a three-dimensional (3D) image using a depth noise filtering apparatus according to an embodiment.

Reference will now be made in detail to the embodiments, examples of which are illustrated in the accompanying drawings, wherein like reference numerals refer to the like elements throughout. The embodiments are described below to explain the present disclosure by referring to the figures.

FIG. 1 illustrates a process of reconstructing a three-dimensional (3D) image using a depth noise filtering apparatus 103 according to an embodiment. Also, the depth noise filtering apparatus 103 of FIG. 1 may be applicable throughout this specification.

Referring to FIG. 1, an image collection apparatus 102 may photograph an object 101 to collect images. Also, the image collection apparatus 102 may collect 3D images from the object 101, that is, the image collection apparatus 102 may obtain color information and depth information associated with the object 101. Here, the color information denotes information that is collected via a charge coupled device (CCD) or a complementary metal-oxide semiconductor (CMOS) image sensor of the image collection apparatus 102. The depth information denotes a distance from the image collection apparatus 102 to each point of the object 101.

For example, the image collection apparatus 102 may measure a duration of time during which a light emitted from the image collection apparatus 102 is reflected from the object 101 to come back to the image collection apparatus 102, and then measure the distance between the object 101 and the image collection apparatus 102. The image collection apparatus 102 may obtain the depth information through the measured distance. In this instance, the obtained depth information may include depth noise according to a distance between the object 101 and the image collection apparatus 102. The depth noise filtering apparatus 103 may perform filtering to remove the depth noise in the depth information. Specifically, the depth noise filtering apparatus 103 may perform filtering using a low pass filter (LPF) to thereby remove the depth noise.

For example, the depth noise filtering apparatus 103 may perform spatial filtering according to the depth information. Also, the depth noise filtering apparatus 103 may perform temporal filtering according to the depth information. Also, the depth noise filtering apparatus 103 may perform both spatial filtering and temporal filtering according to the depth information. Also, the depth noise filtering apparatus 103 may sequentially perform spatial filtering and temporal filtering.

The depth noise filtering apparatus 103 may calculate a size or a coefficient of a filter based on the depth information to thereby generate the filter, and may perform spatial filtering by applying the generated filter. The depth noise filtering apparatus 103 may calculate a number of reference frames based on the depth information to perform temporal filtering.

Specifically, an enhanced 3D image 104 may be generated by reconstructing the filtered depth information and color information.

As described above, the following methods of FIGS. 2 through 5 may be performed by the depth noise filtering apparatus 103 of FIG. 1 and thus may be described with reference to FIG. 1.

Figure 2:
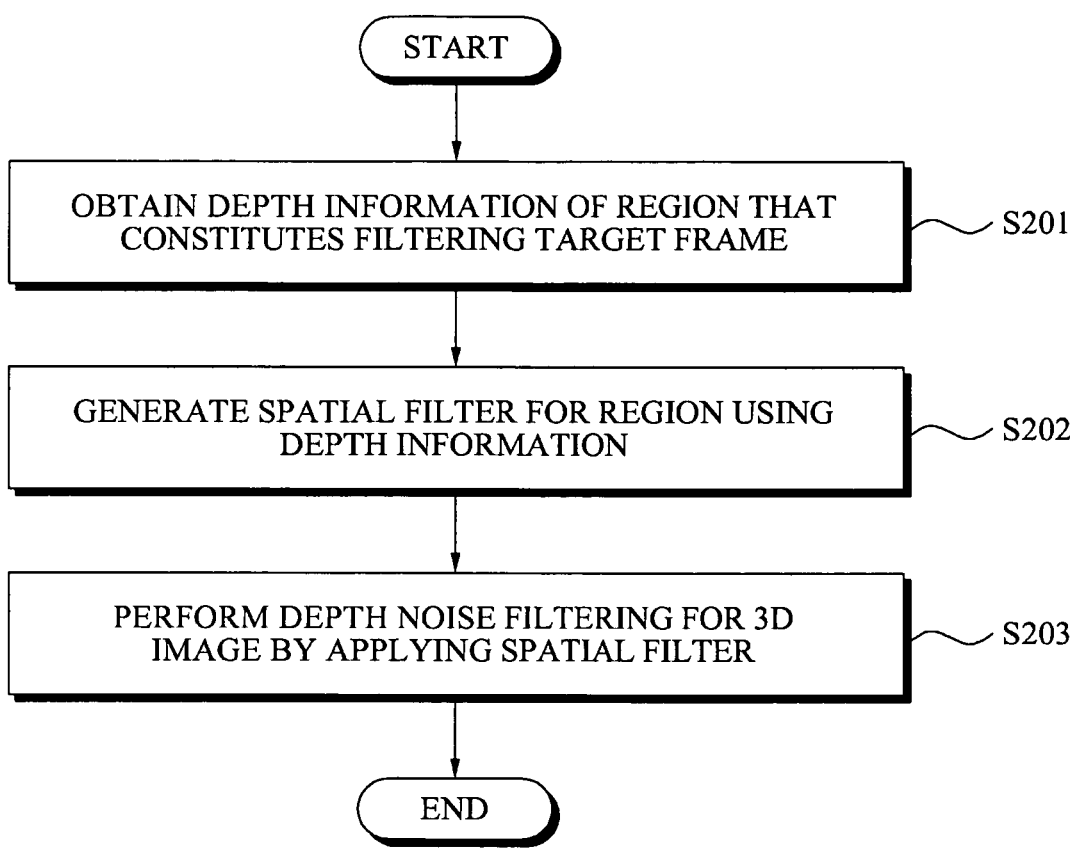
FIG. 2 is a flowchart illustrating a method of performing spatial filtering to remove depth noise according to an embodiment.

FIG. 2 is a flowchart illustrating a method of performing spatial filtering to remove depth noise according to an embodiment.

Referring now to FIGS. 1 and 2, in operation S201, the depth noise filtering apparatus 103 may obtain depth information of a region that constitutes a filtering target frame of a 3D image. Here, the region may be pixels or blocks that constitute the filtering target frame. Specifically, the depth noise filtering apparatus 103 may perform filtering based on a pixel unit or a block unit. The depth information may denote a distance between the object 101 and the image collection apparatus 102.

The depth noise filtering apparatus 103 may obtain, via the image collection apparatus 102, the depth information corresponding to the distance between the object 101 and the image collection apparatus 102.

In operation S202, the depth noise filtering apparatus 103 may generate a spatial filter for the region using the depth information. For example, the depth noise filtering apparatus 103 may determine at least one of a size of the spatial filter and a coefficient of the spatial filter to be applied to the region, based on the depth information.

In this instance, the depth noise filtering apparatus 103 may determine the size of the spatial filter based on the depth information, using the depth information, a measured maximum distance of the image collection apparatus 102, a measured minimum distance of the image collection apparatus 102, and a maximum size of the spatial filter in the measured maximum distance. For example, the depth noise filtering apparatus 103 may determine the size of the spatial filter according to the following Equation 1.

$$\text{Size} = \left( \frac{\text{depth} - \text{min Distance}}{\text{max Distance} - \text{min Distance}} \right) * \max \text{ filtersize} \qquad \text{Equation 1}$$

Here, depth denotes the depth information, size denotes the size of the spatial filter according to the depth information, min Distance denotes the measured minimum distance of the image collection apparatus 102, max Distance denotes the measured maximum distance of the image collection apparatus 102, and max filtersize denotes the maximum size of the spatial filter in the measured maximum distance of the image collection apparatus 102.

For example, it is assumed here that the measured maximum distance of the image collection apparatus 102 is 3.5 m, the measured minimum distance thereof is 0.5 m, and the maximum size of the spatial filter in the measured maximum distance is 9. Also, it is assumed that an actual depth image is between 1.5 m and 3 m. When the depth information is 1.5 m, the size of the spatial filter may be determined as integer 3. In this case, the spatial filter may be determined as a 3×3 filter. The coefficient of the spatial filter may be determined as ⅑. Also, when the depth information is 1.9 m, the size of the spatial filter may be determined as 1.2, and the spatial filter may be determined as a 4×4 filter. The coefficient of the spatial filter may be determined as ¹⁄₁₆. Here, the coefficient of the spatial filter may denote a coefficient of a weight to be applied to the filtering target frame of the 3D image.

According to the above Equation 1, the depth noise filtering apparatus 103 may decrease the size of the spatial filter as the depth information corresponds to shorter distances. Conversely, as the depth information corresponds to longer distances, the depth noise filtering apparatus 103 may increase the size of the spatial filter.

For example, the depth noise filtering apparatus 103 may determine the coefficient of the spatial filter based on the depth information. In the case of the same filter size, the depth noise filtering apparatus 103 may determine the coefficient of the spatial filter to be different based on the depth information.

Here, the coefficient of the spatial filter may decrease while approaching a circumference of the spatial filter from a center of the spatial filter. A decrease rate for the coefficient of the spatial filter from the center of the spatial filter to the circumference thereof may be differently determined. Specifically, as the depth information corresponds to shorter distances, the depth noise filtering apparatus 103 may determine the decrease rate for the coefficient of the spatial filter to be large. Conversely, as the depth information corresponds to longer distances, the depth noise filtering apparatus 103 may determine the decrease rate for the coefficient of the spatial filter to be small.

The decrease rate for the coefficient of the spatial filter may be expressed by, for example, a Gaussian function. In this instance, a width of the Gaussian function may be determined based on a sigma value of the Gaussian function. As the depth information corresponds to shorter distances, the sigma value may be set to be small. Conversely, as the depth information corresponds to longer distances, the sigma value may be set to be large.

The depth noise filtering apparatus 103 may simultaneously determine both the size and the coefficient of the spatial filter based on the depth information. For example, the depth noise filtering apparatus 103 may generate the spatial filter corresponding to the depth information by referring to a table that stores spatial filter information associated with at least one of the size of the spatial filter and the coefficient of the spatial filter that are predetermined based on the depth information. Specifically, the depth noise filtering apparatus 103 may pre-operate a characteristic of the spatial filter with respect to particular depth information and then immediately generate the spatial filter appropriate for input depth information.

When depth information D1 for generating the spatial filter is not set in the table, the depth noise filtering apparatus 103 may generate the spatial filter by combining predetermined depth information existing in the table. Specifically, the depth noise filtering apparatus 103 may determine two pieces of depth information D2 and D3 capable of including the depth information D1, among the predetermined depth information of the table. The spatial filter of the depth information D1 may be generated by applying a weight to a spatial filter of each of the depth information D2 and D3 based on a difference with the depth information D1.

In operation S203, the depth noise filtering apparatus 103 may perform depth noise filtering for the 3D image by applying the spatial filter to the depth information of the region. As described above, the region may be pixels or blocks that constitute the filtering target frame. Depth noise corresponding to a high frequency component may be removed by applying the spatial filter. In particular, since the high frequency component appears as depth noise as the depth information corresponds to longer distances, the depth noise filtering apparatus 103 may remove the depth noise by increasing a strength of the depth noise filtering. An example of applying the spatial filter will be described later in detail with reference to FIG. 9.

Specifically, in a single filtering target frame that constitutes the 3D image, spatial filtering may indicate removing of depth noise by applying the spatial filter to the region that constitutes the filtering target frame. Also, as a distance from the object 101 becomes farther, depth noise may more frequently occur. Accordingly, as the distance from the object 101 becomes farther, the depth noise filtering apparatus 103 may increase the strength of filtering to thereby remove the depth noise.

Figure 3:
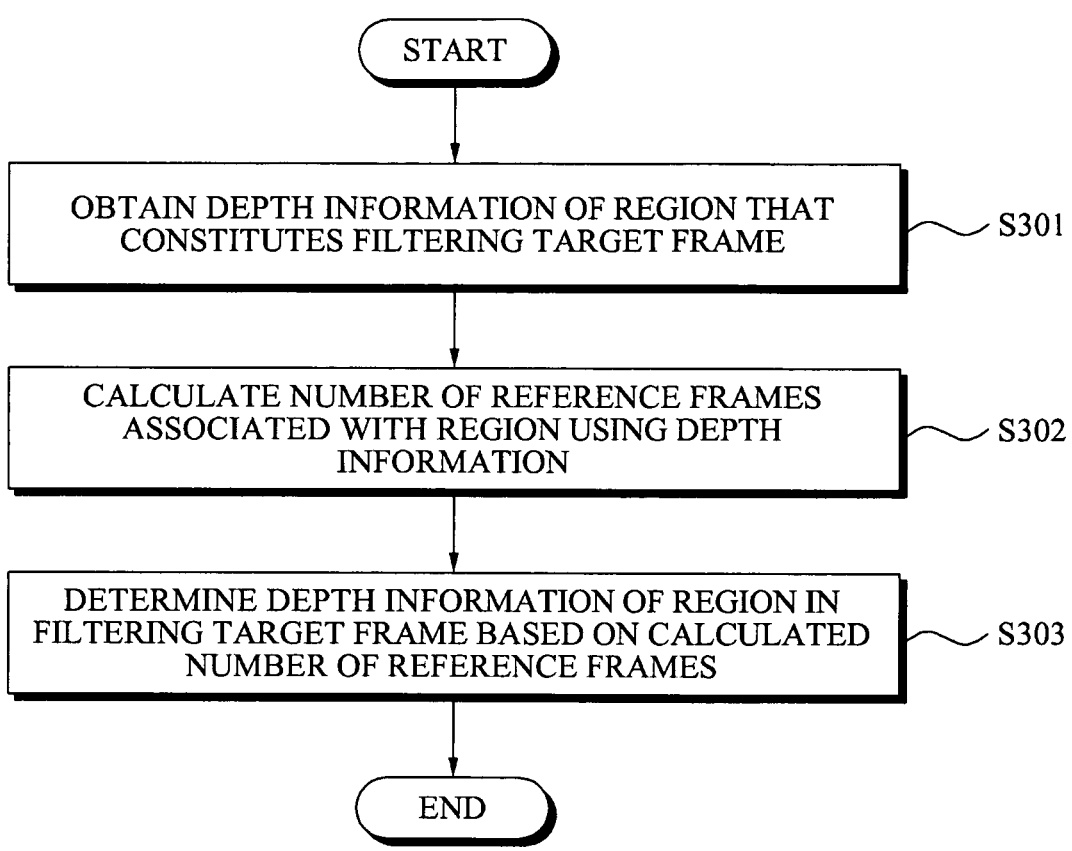
FIG. 3 is a flowchart illustrating a method of performing temporal filtering to remove depth noise according to an embodiment.

FIG. 3 is a flowchart illustrating a method of performing temporal filtering to remove depth noise according to an embodiment.

Referring now to FIGS. 1 and 3, in operation S301, the depth noise filtering apparatus 103 may obtain depth information of a region that constitutes a filtering target frame of a 3D image. In this instance, the depth noise filtering apparatus 103 may obtain the depth information from the image collection apparatus 102. The region and the depth information are the same as the description made above with reference to FIG. 2.

In operation S302, the depth noise filtering apparatus 103 may calculate a number of reference frames associated with the region using the depth information. Since the depth information is different for each region, the number of reference frames calculated for each region may be also different. In this instance, a plurality of frames that appears temporally previously or subsequently based on the filtering target frame may be determined as the reference frames.

The depth noise filtering apparatus 103 may calculate the number of reference frames based on the depth information, using at least one of the depth information, a measured maximum distance of the image collection apparatus 102, a measured minimum distance of the image collection apparatus 102, and a number of reference frames in the measured maximum distance. For example, the depth noise filtering apparatus 103 may calculate the number of reference frames according to the following Equation 2.

$$Num = \left(\frac{depth - min\ Distance}{max\ Distance - min\ Distance}\right) * max\ Num\ of\ frames \quad \text{Equation 2}$$

Here, depth denotes the depth information, $Num^2$ equals the number of reference frames, min Distance denotes the measured minimum distance of the image collection apparatus 102, max Distance denotes the measured maximum distance of the image collection apparatus 102, and max Num of frames denotes a maximum number of reference frames in the measured maximum distance of the image collection apparatus 102.

For example, it is assumed here that the measured maximum distance of the image collection apparatus 102 is 3.5 m, the measured minimum distance thereof is 0.5 m, and the maximum number of reference frames in the measured maximum distance is 25. Also, it is assumed that an actual depth image is between 1.5 m and 3 m. When the depth information is 1.5 m, Num may be determined as integer 3 and thus the number of reference frames may become 9. Also, when the depth information is 1.9 m, Num may be determined as 4.2 and thus the number of reference frames may become 16.

In this instance, a weight to be applied to a region of each reference frame may be determined to be in inverse proportion to the number of reference frames. Specifically, when the number of reference frames is 9, a weight ⅑ may be applicable to depth information of a region of each of nine reference frames.

According to the above Equation 2, the depth noise filtering apparatus 103 may decrease the number of reference frames as the depth information corresponds to shorter distances and, conversely, may increase the number of reference frames as the depth information corresponds to longer distances.

In operation S303, the depth noise filtering apparatus 103 may determine the depth information of the region in the filtering target frame based on the calculated number of reference frames. For example, the depth noise filtering apparatus 103 may average depth information of the calculated reference frames to determine depth information of the region in the filtering target frame.

For example, when the number of reference frames is 9, the depth noise filtering apparatus 103 may initially apply a weight ⅑ to depth information of a region of each of nine reference frames corresponding to the region of the filtering target frame. Next, the depth noise filtering apparatus 103 may average the result of the application and determine the depth information of the region of the filtering target frame.

Figure 4:
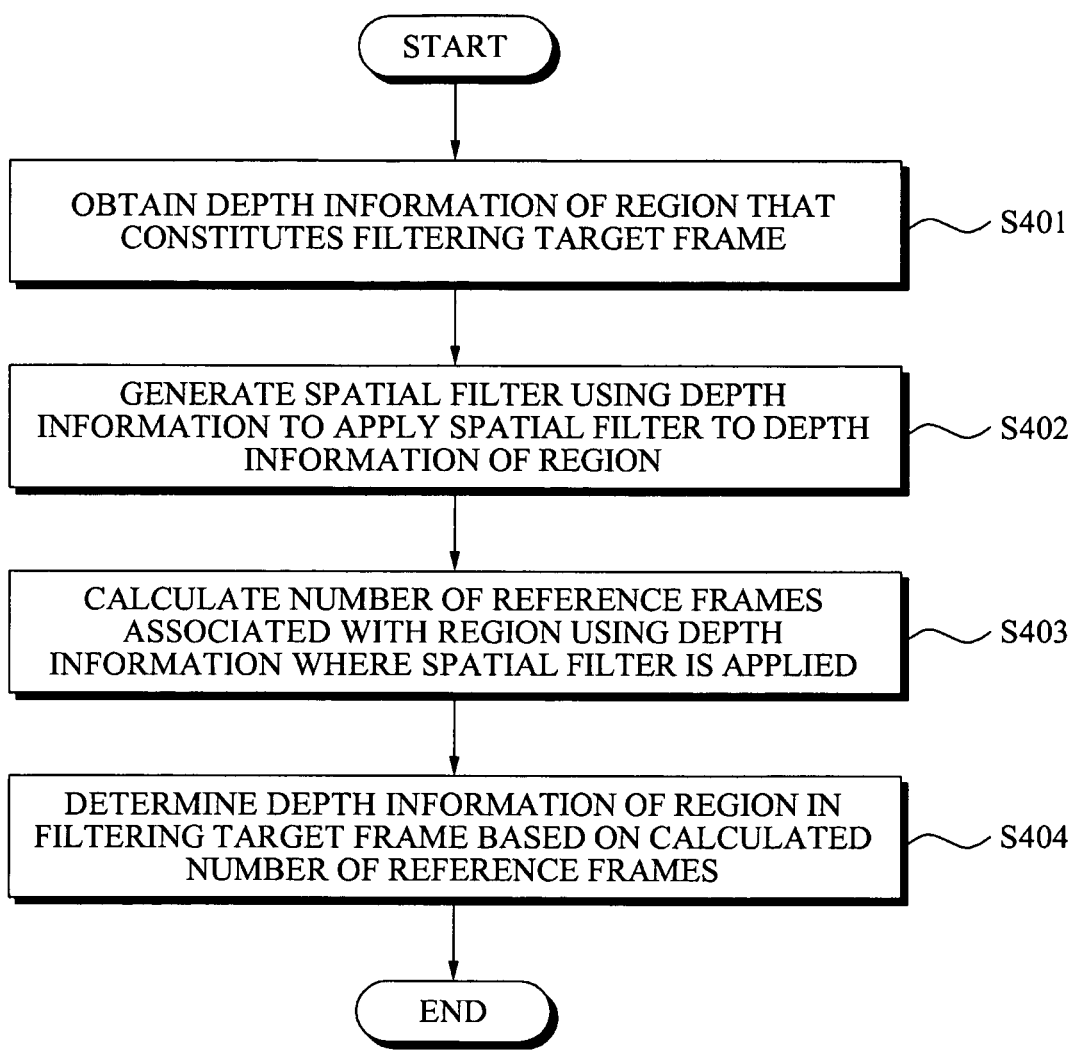
FIG. 4 is a flowchart illustrating a method of performing spatial filtering and temporal filtering to remove depth noise according to an embodiment.

FIG. 4 is a flowchart illustrating a method of performing spatial filtering and temporal filtering to remove depth noise according to an embodiment.

Referring now to FIGS. 1 and 4, in operation S401, the depth noise filtering apparatus 103 may obtain depth information of a region that constitutes a filtering target frame of a 3D image. The region and the depth information may refer to the description made above with reference to FIG. 2.

In operation S402, the depth noise filtering apparatus 103 may generate a spatial filter for the region using the depth information obtained in operation S401 to apply the spatial filter to the depth information of the region. Here, operations S401 and S402 may indicate spatial filtering. Further detailed description related to operations S401 and S402 may refer to the description made above with reference to FIG. 2.

In operation S403, the depth noise filtering apparatus 103 may calculate a number of reference frames associated with the region using the depth information of the region that constitutes the filtering target frame. Here, the spatial filter is applied to the depth information.

In operation S404, the depth noise filtering apparatus 103 may determine updated depth information of the region in the filtering target frame based on the calculated number of reference frames which is calculated using the depth information obtained in S403. Here, operations S403 and S404 may indicate temporal filtering. Further detailed description related to operations S403 and S404 may refer to the description made above with reference to FIG. 2.

Specifically, FIG. 4 may illustrate an example of initially applying spatial filtering and subsequently applying temporal filtering with respect to the 3D image.

Figure 5:
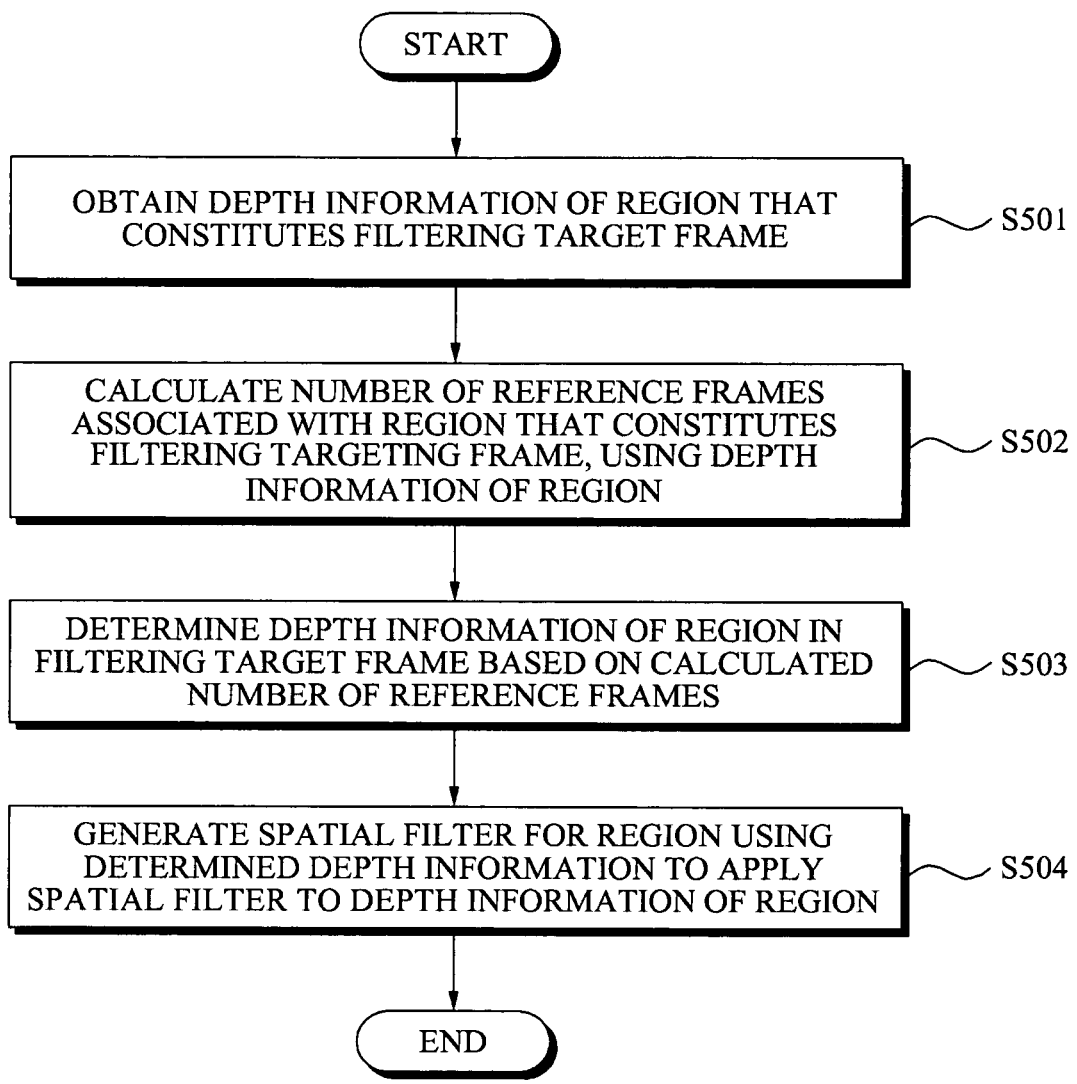
FIG. 5 is a flowchart illustrating a method of performing temporal filtering and spatial filtering to remove depth noise according to an embodiment.

FIG. 5 is a flowchart illustrating a method of performing temporal filtering and spatial filtering to remove depth noise according to an embodiment.

Referring now to FIGS. 1 and 5, in operation S501, the depth noise filtering apparatus 103 may obtain depth information of a region that constitutes a filtering target frame of a 3D image. The region and the depth information may refer to the description made above with reference to FIG. 2.

In operation S502, the depth noise filtering apparatus 103 may calculate a number of reference frames associated with the region that constitutes the filtering target frame of the 3D image, using the depth information of the region.

In operation S503, the depth noise filtering apparatus 103 may determine depth information of the region in the filtering target frame based on the calculated number of reference frames. Here, operations S502 and S503 may be associated with the aforementioned process of applying temporal filtering and thus further detailed description related thereto may refer to the description made above with reference to FIG. 3.

In operation S504, the depth noise filtering apparatus 103 may generate a spatial filter of the region using the depth information determined in operation S503 and apply the spatial filter to the depth information of the region determined in operation S503.

Here, operation S504 may be associated with the aforementioned process of applying spatial filtering and thus further detailed description related thereto may refer to the description made above with reference to FIG. 3.

Specifically, FIG. 5 may illustrate an example of initially applying temporal filtering and subsequently applying spatial filtering with respect to the 3D image.

Figure 6:
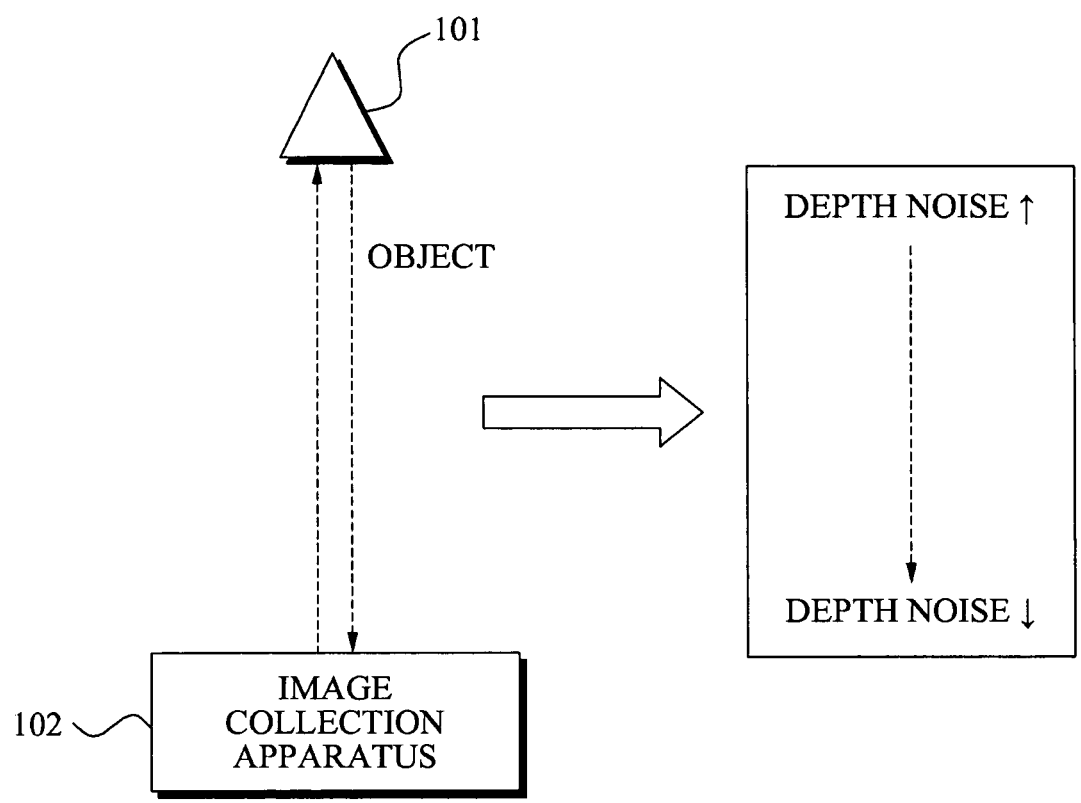
FIG. 6 illustrates an example of a depth noise difference based on depth information according to an embodiment.

FIG. 6 is a diagram illustrating an example of a depth noise difference based on depth information according to an embodiment.

Referring to FIG. 6, it is possible to verify a level of depth noise according to depth information that is a distance between an object 101 and an image collection apparatus 102. As described above with reference to FIG. 1, the depth information may be determined by dividing, by a light speed, a duration of time during which a light emitted from the image collection apparatus 102 is reflected from the object 101 to come back to the image collection apparatus 102. In this instance, when the object 101 is positioned to be close to the image collection apparatus 102, a light intensity of light reflected from the object 101 may be large and thus an accuracy of the depth information may be high. Accordingly, as a distance between the object 101 and the image collection apparatus 102 becomes closer, depth noise may be relatively small. Conversely, when the object 101 is positioned to be away from the image collection apparatus 102, the light intensity of the reflected light may be small and thus the accuracy of the depth information may be low. In this instance, the depth noise against the depth information may be relatively large.

Specifically, as the distance between the object 101 and the image collection apparatus 102 becomes farther, depth noise may increase. Conversely, as the distance between the object 101 and the image collection apparatus 102 becomes closer, depth noise may decrease. Accordingly, the depth noise filtering apparatus 103 of FIG. 1 according to an embodiment may generate the spatial filter so that the coefficient of the spatial filter may decrease while approaching a circumference of the spatial filter from a center of the spatial filter. In this instance, the depth noise filtering apparatus 103 may determine a decrease rate for the coefficient of the spatial filter to be different based on the depth information. For example, as the distance between the object 101 and the image collection apparatus 102 becomes farther, the depth noise filtering apparatus 103 may reduce the decrease rate for the coefficient of the spatial filter. Conversely, as the distance between the object 101 and the image collection apparatus 102 becomes closer, the depth noise filtering apparatus 103 may increase the decrease rate for the coefficient of the spatial filter. Also, as the distance between the object 101 and the image collection apparatus 102 becomes farther, the depth noise filtering apparatus 103 may increase the number of reference frames for temporal filtering.

Figure 7:
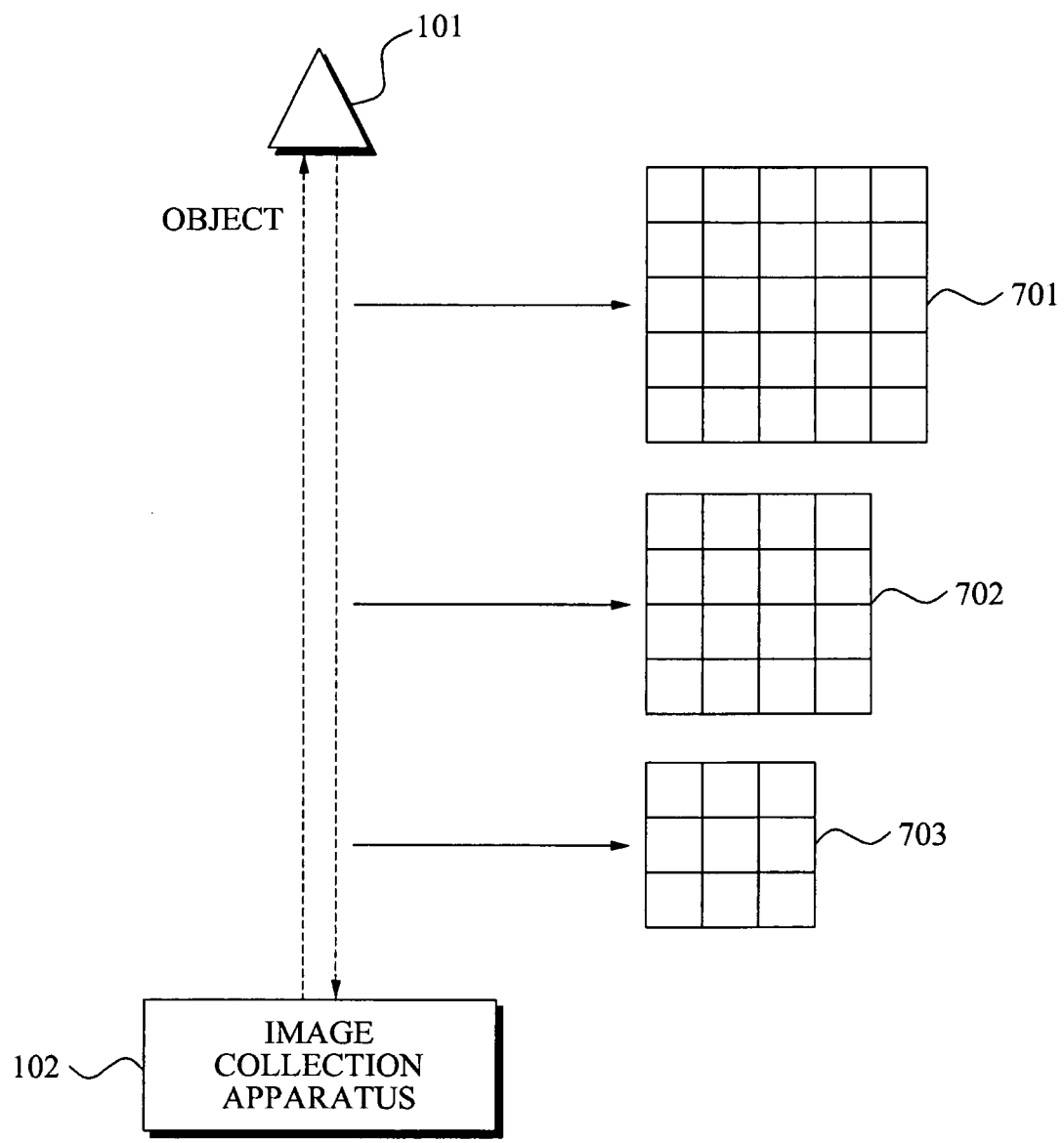
FIG. 7 illustrates a process of calculating a size of a spatial filter based on depth information according to an embodiment.

FIG. 7 illustrates a process of calculating a size of a spatial filter based on depth information according to an embodiment.

As described above with reference to FIG. 6, the depth noise filtering apparatus 103 of FIG. 1 may increase the size of the spatial filter for spatial filtering as a distance between an object 101 and an image collection apparatus 102 becomes farther. Specifically, when the distance between the object 101 and the image collection apparatus 102 corresponds to longer distances, a 5×5 spatial filter 701 may be determined. When the distance between the object 101 and the image collection apparatus 102 corresponds to intermediate distances, a 4×4 spatial filter 702 may be determined. Also, when the distance between the object 101 and the image collection apparatus 102 corresponds to short distances, a 3×3 spatial filter 703 may be determined.

The process of determining the size of the spatial filter may refer to the above Equation 1.

Figure 8:
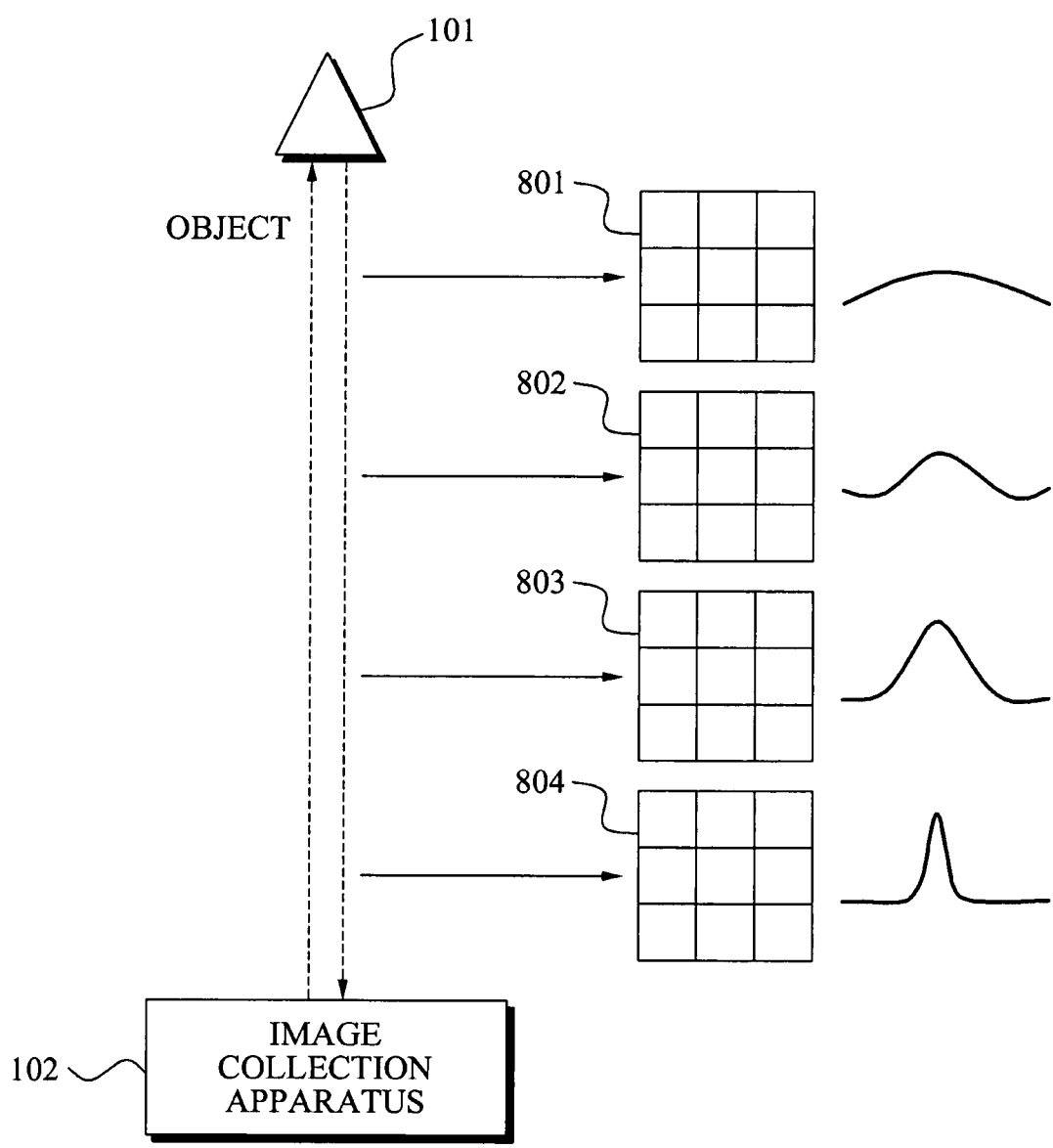
FIG. 8 illustrates a process of calculating a coefficient of a spatial filter based on depth information according to an embodiment.

FIG. 8 illustrates a process of calculating a coefficient of a spatial filter based on depth information according to an embodiment.

It is assumed here that spatial filters 801, 802, 803, and 804 have the same size.

As described above with reference to FIG. 6, the depth noise filtering apparatus 103 of FIG. 1 may reduce a decrease rate for the coefficient of the spatial filter as a distance between an object 101 and an image collection apparatus 102 becomes farther. Specifically, while approaching a circumference of the spatial filter from a center of the spatial filter, the depth noise filtering apparatus 103 may decrease the coefficient of the spatial filter. In this instance, the depth noise filtering apparatus 103 may differently determine the decrease rate for the coefficient of the spatial filter based on the depth information.

As the depth information corresponds to short distances, the depth noise filtering apparatus 103 may increase the decrease rate for the coefficient of the spatial filter. When performing spatial filtering, a region to be applied with the spatial filter may be less affected by depth information of neighboring regions. Conversely, as the depth information corresponds to longer distances, the depth noise filtering apparatus 103 may decrease the decrease rate for the coefficient of the spatial filter. Specifically, when performing spatial filtering, the region to be applied with the spatial filter may be greatly affected by the depth information of the neighboring regions.

Referring to FIG. 8, the decrease rate for the coefficient of the spatial filter may be expressed by a Gaussian function. Here, a sigma value to determine a width of the Gaussian function denotes the decrease rate for the coefficient of the spatial filter, and may be set to be different based on the depth information. For example, when the depth information corresponds to short distances, the sigma value of the Gaussian function may be set to be small. Conversely, when the depth information corresponds to long distances, the sigma value of the Gaussian function may be set to be large.

Referring to FIG. 8, as a distance between an object 101 and an image collection apparatus 102 becomes farther, depth noise may be strong and thus the depth noise filtering apparatus 103 may increase a filtering strength. Specifically, as the filtering strength increases, it is possible to remove a large amount of high frequency components in the depth information. Conversely, as the distance between the object 101 and the image collection apparatus 103 becomes closer, depth noise may be weak and thus the depth noise filtering apparatus 103 may decrease the filtering strength. For example, when the depth information corresponds to long distances, a high frequency component of a 3D image may be a noise component. In this instance, the depth noise filtering apparatus 103 may adjust the filtering strength to thereby remove the high frequency component corresponding to the noise component. Conversely, when the depth information corresponds to short distances, the high frequency component of the 3D image may be an original component of the 3D image, not the noise component. Accordingly, the depth noise filtering apparatus 103 may adjust the filtering strength to thereby remain the high frequency component corresponding to the original component of the 3D image.

Figure 9:
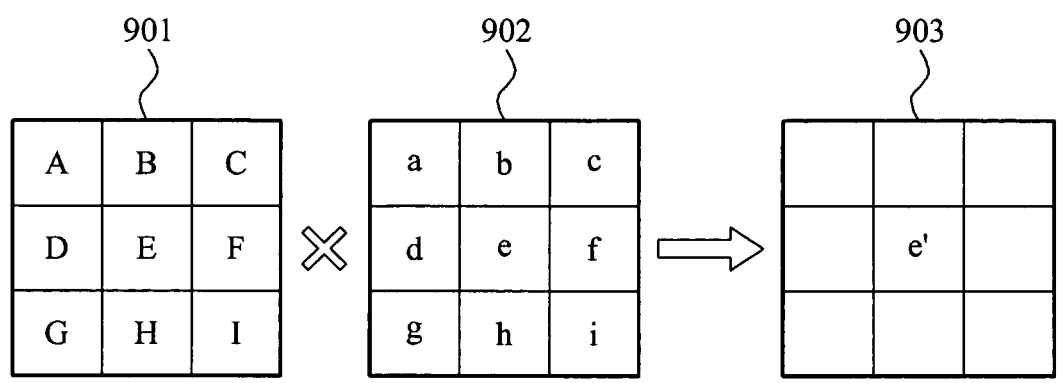
FIG. 9 illustrates an example of applying a spatial filter to depth information according to an embodiment.

FIG. 9 illustrates an example of applying a spatial filter 901 to depth information according to an embodiment.

The spatial filter 901 denotes a spatial filter that is generated by the depth noise filtering apparatus 103 of FIG. 1. The depth information 902 denotes depth information of a region to be applied with the spatial filter 901. In this instance, the spatial filter 901 may be applied to a region e. The region e may be pixels or a block that is composed of the pixels.

Another depth information 903 may be obtained by applying the spatial filter 901 to the depth information 902 of the region. Specifically, the depth information 903 corresponds to a result of performing spatial filtering. e' denotes depth information where spatial filtering is performed.

For example, the depth information e' where spatial filtering is performed may be determined according to the following Equation 3

$$e' = (A \times a) + (B \times b) + (C \times c) + (D \times d) + (E \times e) + (F \times f) + (G \times g) + (H \times h) + (I \times i).$$  Equation 3:

Referring to the above Equation 3, spatial filtering may be performed based on depth information of neighboring regions of the region to be applied with the spatial filter 901. The above filtering process may be referred to as a mask-based filtering process. According to an embodiment, a size or a coefficient of a spatial filter may be determined based on depth information of a filtering target region.

Figure 10:
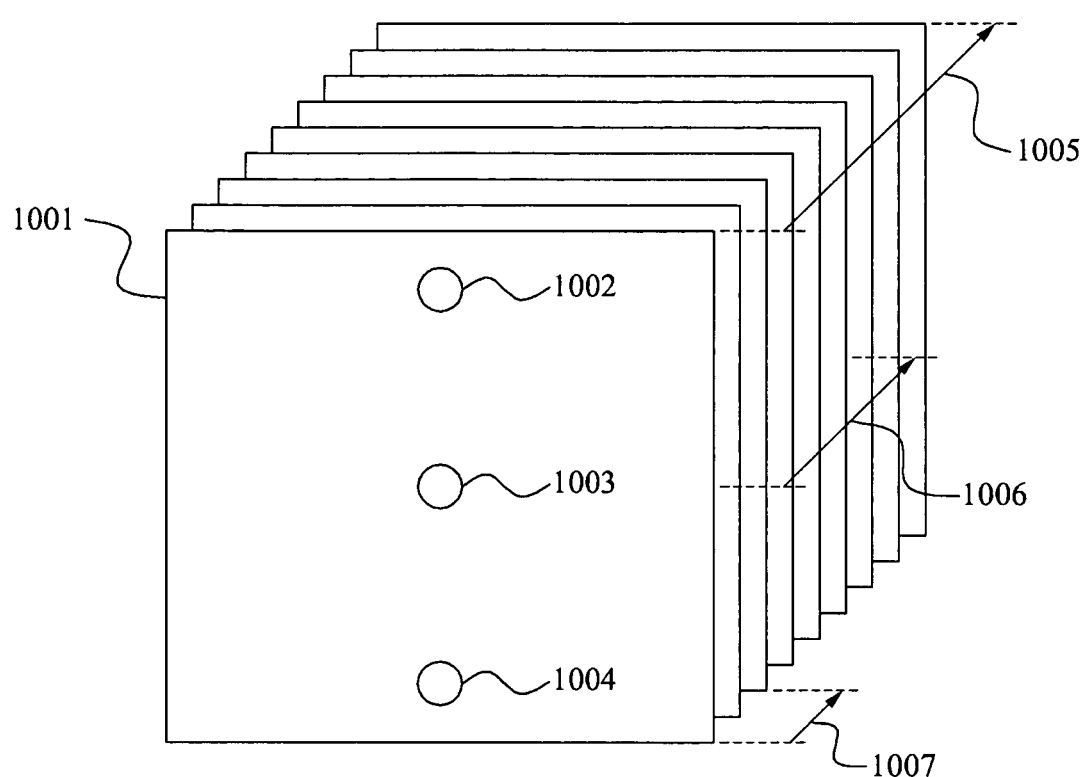
FIG. 10 illustrates an example of determining a number of reference frames based on depth information to thereby perform temporal filtering according to an embodiment.

FIG. 10 illustrates an example of determining a number of reference frames based on depth information to perform temporal filtering according to an embodiment.

A plurality of frames of FIG. 10 may denote the reference frames to perform temporal filtering. Here, it is assumed that a frame 1001 is a filtering target frame. The filtering target frame 1001 may include regions 1002, 1003, and 1004.

Also, it is assumed here that depth information of the region 1002 is obtained from the object 101 of FIG. 1 that is positioned to be away from the image collection apparatus 102, depth information of the region 1003 is obtained from the object 101 (FIG. 1) that is positioned to be in an intermediate distance from the image collection apparatus 102 (FIG. 1), and depth information of the region 1004 is obtained from the object 101 (FIG. 1) that is positioned to be in a close distance from the image collection apparatus 102 (FIG. 2).

According to an embodiment, the depth noise filtering apparatus 103 (FIG. 1) may calculate a number of reference frames associated with the region using the depth information. For example, the depth noise filtering apparatus 103 (FIG. 1) may increase the number of reference frames as depth information of the region corresponds to longer distances, and conversely, may decrease the number of reference frames as the depth information of the region corresponds to shorter distances.

Referring to FIG. 10, in the case of the region 1004, the depth information may correspond to short distances and thus a relatively small number of reference frames 1007 may be determined. Also, in the case of the region 1003, the depth information may correspond to intermediate distances and thus an intermediate number of reference frames 1006, greater than the number of reference frames 1007, may be determined. Also, in the case of the region 1002, the depth information may correspond to long distances and thus a relatively large number of reference frames 1005 may be determined. In this instance, it can be seen that the number of reference frames 1005 is greater than the number of reference frames 1006 or 1007.

Specifically, according to an embodiment, in the filtering target frame 1001, the depth noise filtering apparatus 103 may decrease a number of reference frames as depth information corresponds to shorter distances and may increase the number of reference frames as the depth information corresponds to longer distances. For example, when performing temporal filtering for the region 1003, the depth noise filtering apparatus 103 may update the depth information of the region 1003 by averaging depth information of the region 1003 in a reference frame corresponding to the number of reference frames 1006.

Figure 11:
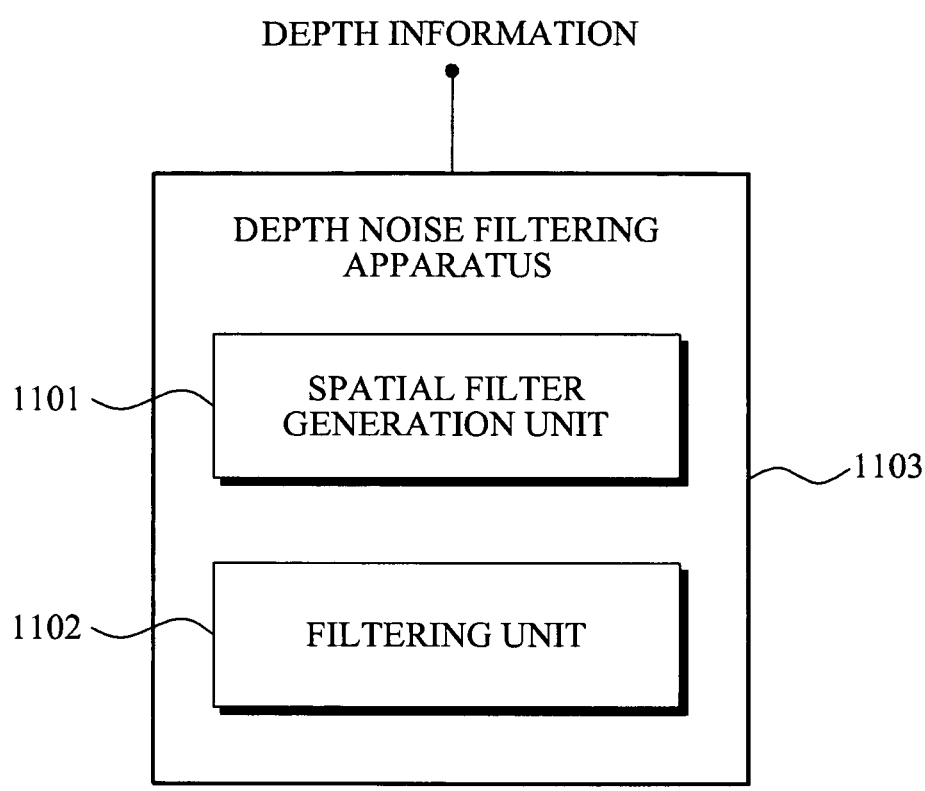
FIG. 11 illustrates a configuration of a depth noise filtering apparatus to perform spatial filtering according to an embodiment.

FIG. 11 is a block diagram illustrating a configuration of a depth noise filtering apparatus 1103 to perform spatial filtering according to an embodiment.

Referring to FIG. 11, the depth noise filtering apparatus 1103 may include a spatial filter generation unit 1101 and a filtering unit 1102.

The spatial filter generation unit 1101 may generate a spatial filter for a region that constitutes a filtering target frame of a 3D image, using depth information of the region. For example, the spatial filter generation unit 1101 may calculate at least one of a size and a coefficient of the spatial filter, using the depth information. Also, the spatial filter generation unit 1101 may simultaneously calculate both the size and the coefficient of the spatial filter. As described above with reference to FIG. 1, the region may be pixels or blocks that constitute the filtering target frame. Depth information may correspond to a distance between an image collection apparatus and an object.

In this instance, the spatial filter generation unit 1101 may determine the size of the spatial filter based on the depth information, using the depth information, a measured maximum distance of the image collection apparatus, a measured minimum distance of the image collection apparatus, and a maximum size of the spatial filter in the measured maximum distance.

Also, the spatial filter generation unit 1101 may decrease the size of the spatial filter as the depth information corresponds to shorter distances, and conversely, may increase the size of the spatial filter as the depth information corresponds to longer distances. Also, the spatial filter generation unit 1101 may generate the spatial filter so that the coefficient of the spatial filter may decrease while approaching a circumference of the spatial filter to a center of the spatial filter. For example, the spatial filter generation unit 1101 may determine the decrease rate to be different according to the depth information. Specifically, the spatial filter generation unit 1101 may increase the decrease rate for the coefficient of the spatial filter as the depth information corresponds to shorter distances. Conversely, as the depth information corresponds to longer distances, the spatial filter generation unit 1101 may decrease the decrease rate for the coefficient of the spatial filter.

Specifically, the spatial filter generation unit 1101 may generate the spatial filter in real time by performing an operation process based on the depth information. Also, for example, the spatial filter generation unit 1101 may generate the spatial filter corresponding to the depth information by referring to a table that stores spatial filter information associated with at least one of the size of the spatial filter and the coefficient of the spatial filter that are predetermined based on the depth information. Specifically, the spatial filter generation unit 1101 may pre-operate a characteristic of the spatial filter with respect to particular depth information and then immediately generate the spatial filter appropriate for input depth information.

In this instance, when the table does not store depth information D1 for generating the spatial filter, the spatial filter generation unit 1101 may generate the spatial filter by combining predetermined depth information existing in the table. Specifically, the spatial filter generation unit 1101 may generate a spatial filter according to the depth information D1 by applying a weight to a spatial filter corresponding to each of two pieces of depth information D2 and D3 capable of including the depth information D1.

The filtering unit 1102 may perform depth noise filtering for the 3D image by applying the spatial filter to the depth information of the region. In this instance, depth noise filtering may be performed based on depth information of neighboring regions of the region by applying a mask-based spatial filter.

Figure 12:
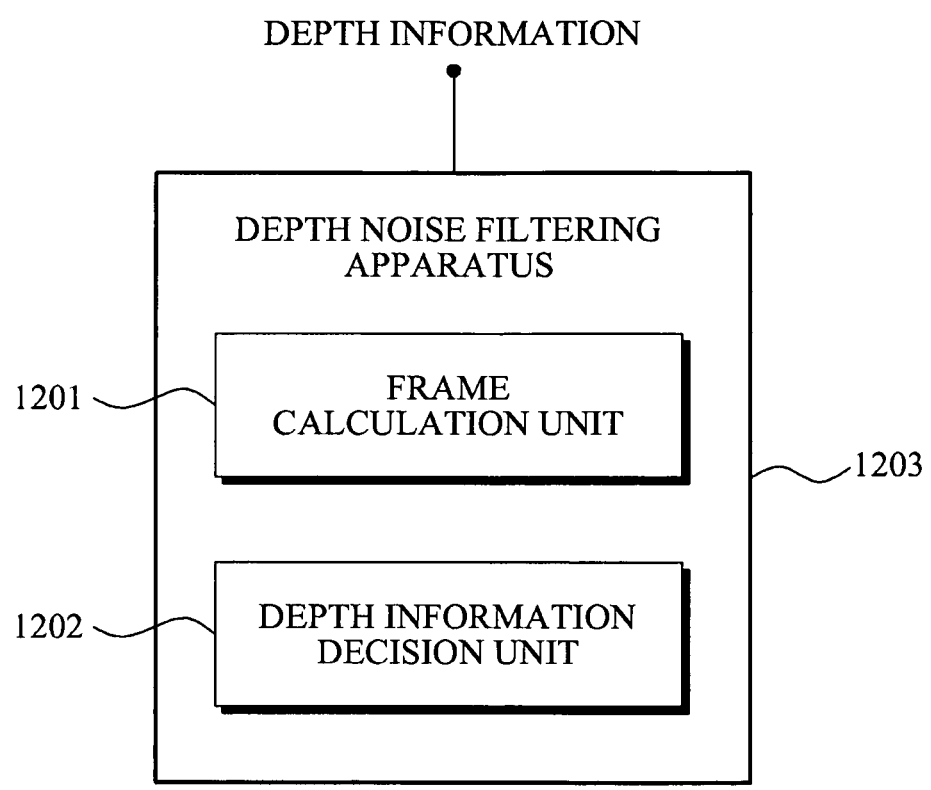
FIG. 12 illustrates a configuration of a depth noise filtering apparatus to perform temporal filtering according to an embodiment.

FIG. 12 is a block diagram illustrating a configuration of a depth noise filtering apparatus 1203 to perform temporal filtering according to an embodiment.

Referring to FIG. 12, the depth noise filtering apparatus 1203 may include a frame calculation unit 1201 and a depth noise decision unit 1202.

The frame calculation unit 1201 may calculate a number of reference frames associated with a region that constitutes a filtering target frame of a 3D image, using the depth information of the region. For example, the frame calculation unit 1201 may calculate the number of reference frames based on the depth information, using the depth information, a measured maximum distance of the image collection apparatus, a measured minimum distance of the image collection apparatus, and a number of reference frames in the measured maximum distance. In this instance, as the depth information of the region corresponds to longer distances, the frame calculation unit 1201 may increase the number of reference frames. Conversely, as the depth information of the region corresponds to shorter distances, the frame calculation unit 1201 may decrease the number of reference frames.

The depth information decision unit 1202 may determine the depth information of the region in the filtering target frame based on the calculated number of reference frames. For example, the depth information decision unit 1202 may average depth information of a region of each of the reference frames to determine the depth information of the region in the filtering target frame.

Matters not described in FIGS. 11 and 12 may refer to descriptions made above with reference to FIGS. 1 through 10.

According to an embodiment, there may be provided a depth noise filtering method and apparatus that may perform spatial filtering according to depth information and thereby adaptively remove depth noise.

According to an embodiment, there may be provided a depth noise filtering method and apparatus that may perform temporal filtering according to depth information and thereby adaptively remove depth noise.

According to an embodiment, there may be provided a depth noise filtering method and apparatus that may calculate a size or a coefficient of a spatial filter according to depth information in order to perform spatial filtering and thereby effectively remove depth noise according to the depth information.

According to an embodiment, there may be provided a depth noise filtering method and apparatus that may determine a number of reference frames based on depth information in order to perform temporal filtering and thereby effectively remove depth noise according to the depth information.

The depth noise filtering method according to the above-described embodiments can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method of filtering depth noise, the method comprising:
obtaining depth information of a region that constitutes a filtering target frame of a three-dimensional (3D) image;
generating automatically a spatial filter for the region using the depth information; and
performing depth noise filtering for the 3D image by applying the generated spatial filter to the depth information of the region,
wherein the generating comprises determining at least one of a size of a spatial filter and a coefficient of the spatial filter to be applied to the region, based on the depth information,
wherein the size of the spatial filter for a particular pixel is related to a depth value for the particular pixel in depth information, and
wherein strength of the coefficient of the spatial filter for a particular pixel is related to the depth value for the particular pixel in depth information.

2. The method of claim 1, wherein:
the depth information corresponds to a distance between an object and an image collection apparatus with respect to the region.

3. The method of claim 2, wherein the generating comprises determining the size of the spatial filter based on the depth information, using at least one of the depth information, a measured maximum distance of the image collection apparatus, a measured minimum distance of the image collection apparatus, and a maximum size of the spatial filter in the measured maximum distance.

4. The method of claim 2, wherein the generating comprises generating the spatial filter corresponding to the depth information by referring to a table that stores spatial filter information associated with at least one of the size of the spatial filter and the coefficient of the spatial filter that are predetermined based on the depth information.

5. The method of claim 2, wherein the generating further comprises decreasing the size of the spatial filter as the depth information corresponds to shorter distances.

6. The method of claim 1, wherein the region is any one of pixels or blocks that constitute the filtering target frame.

7. A non-transitory computer-readable recording medium storing a program for causing at least one processor to implement the method of claim 1.

8. A method of filtering depth noise, the method comprising:
obtaining depth information of a region that constitutes a filtering target frame of a three-dimensional (3D) image;
generating a spatial filter for the region using the depth information; and
performing depth noise filtering for the 3D image by applying the spatial filter to the depth information of the region,
wherein:
the depth information corresponds to a distance between an object and an image collection apparatus with respect to the region, and
the generating comprises determining at least one of a size of the spatial filter and a coefficient of the spatial filter to be applied to the region, based on the depth information, and
wherein:
the generating further comprises increasing a decrease rate for the coefficient of the spatial filter as the depth information corresponds to shorter distances, and
the coefficient of the spatial filter decreases while approaching a circumference of the spatial filter from a center of the spatial filter.

9. An apparatus for filtering depth noise, the apparatus comprising:
a spatial filter generation unit to automatically generate a spatial filter for a region that constitutes a filtering target frame of a 3D image, using depth information of the region; and
a filtering unit to perform depth noise filtering for the 3D image by applying the generated spatial filter to the depth information of the region,
wherein the spatial filter generation unit determines at least one of a size of a spatial filter and a coefficient of a spatial filter to be applied to the region, based on the depth information,
wherein the size of the spatial filter for a particular pixel is related to a depth value for the particular pixel in depth information, and
wherein strength of the coefficient of the spatial filter for a particular pixel is related to the depth value for the particular pixel in depth information.

10. The apparatus of claim 9, wherein:
the depth information corresponds to a distance between an object and an image collection apparatus with respect to the region.

11. The apparatus of claim 10, wherein the spatial filter generation unit generates the spatial filter corresponding to the depth information by referring to a table that stores spatial filter information associated with at least one of the size of the spatial filter and the coefficient of the spatial filter that are predetermined based on the depth information.

* * * * *